United States Patent

Matsumoto

Patent Number: 5,852,932
Date of Patent: Dec. 29, 1998

[54] ONE-WAY CLUTCH MECHANISM OF A TORQUE CONVERTER

[75] Inventor: Shogo Matsumoto, Susono, Japan

[73] Assignee: Toyota Jidosha Kabushiki Kaisha, Toyota, Japan

[21] Appl. No.: 857,000

[22] Filed: May 15, 1997

[30] Foreign Application Priority Data

May 17, 1996 [JP] Japan .................................. 8-123112

[51] Int. Cl.⁶ .................................................. F16D 33/00
[52] U.S. Cl. ............................ 60/345; 192/46; 192/89.21
[58] Field of Search ........................ 60/345, 346; 192/46, 192/89.21, 69.82

[56] References Cited

U.S. PATENT DOCUMENTS

| 1,849,212 | 3/1932 | Winther | 192/46 |
|---|---|---|---|
| 2,034,429 | 3/1936 | De Lavaud . | |
| 2,461,217 | 2/1949 | Lapsley et al. | 60/345 |
| 3,433,337 | 3/1969 | Salter | 192/46 |
| 3,461,670 | 8/1969 | Waclawek . | |
| 3,724,208 | 4/1973 | Welch et al. . | |
| 4,441,315 | 4/1984 | Bochot . | |

FOREIGN PATENT DOCUMENTS

| 1 500 433 | 4/1969 | Germany . |
|---|---|---|
| 5-45306 | 6/1993 | Japan . |
| WO 82/04109 | 11/1982 | WIPO . |

OTHER PUBLICATIONS

Derwent Abstracts, AN 812681, Dec. 21, 1983, SU 985 512, Jul. 17, 1881.

Primary Examiner—F. Daniel Lopez
Attorney, Agent, or Firm—Oblon, Spivak, McClelland, Maier & Neustadt, P.C.

[57] ABSTRACT

In the one-way clutch of a torque converter, an outer race (30) in FIG. 10A) which is assembled on the inner circumferential side of a stator so as to be unrotatable includes a first side face (31) which is provided with first teeth (32). An inner race (40) which is mounted on a stationary shaft so as to be unrotatable includes a second side face (41) which is opposite to the first side face (31) and which is provided with second teeth (42). With the rotation of the outer race (30), the first teeth (32) and the second teeth (42) are engaged and disengaged by the functions of an intermediate member (50) which moves along inclined planes (33) formed in the first side face (31). Thus, shock noise are prevented during the release of the one-way clutch.

7 Claims, 10 Drawing Sheets

ONE-WAY CLUTCH MECHANISM OF A TORQUE CONVERTER

BACKGROUND OF THE INVENTION

1. Field of the Invention

The present invention relates to the one-way clutch mechanism of a torque converter.

2. Description of the Related Art

In general, a torque converter for a motor vehicle has a pump impeller which generates a fluid stream, a turbine runner which is rotated by the fluid stream, a stationary shaft, and a stator which is arranged between the pump impeller and the turbine runner so as to receive a turning force from the fluid stream. The stator is connected and fixed to the stationary shaft by a one-way clutch only when it has received the turning force of specified direction from the fluid stream.

Figure 16:
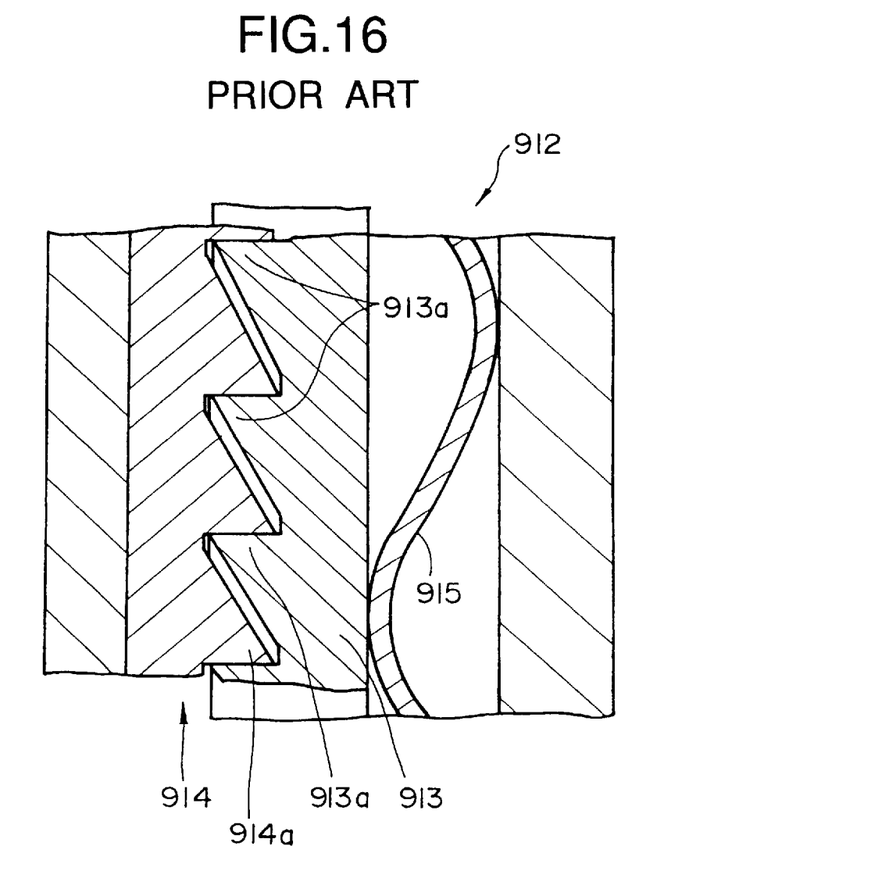
FIG. 16 is a sectional view showing a one-way clutch mechanism in the prior art.

Such a one-way clutch constructed as shown in FIG. 16 of the accompanying drawings is disclosed in, for example, the official gazette of Japanese Utility Model Registration Application Laid-open No. 45306/1993.

The one-way clutch 912 has an outer race 913, an inner race 914 and a wave spring 915. The outer race 913 is unrotatably fixed on the inner circumferential side of a stator (not shown), and has a plurality of first teeth 913a. The inner race 914 is capable of disengagement from the outer race 913, and has a plurality of second teeth 914a which can mesh with the first teeth 913a so as to prohibit the outer race 913 from rotating onto one side. The wave spring 915 urges the outer race 913 toward the inner race 914.

The one-way clutch 912 disclosed in the above official gazette has the problem that, since the outer race 913 is always urged by the wave spring 915, shock noise is produced in a case where the first teeth 913a and second teeth 914a lying in mesh are disengaged from each other and are restored into the meshed or engaged state again, in the idle mode of the clutch 912 (in other words, during the release of the clutch 912).

SUMMARY OF THE INVENTION

The present invention has been made in view of the problem of the prior art as stated above, and has for its object to provide the one-way clutch mechanism of a torque converter which can suppress the drawback of the production of shock noise.

According to a feature of the present invention, an intermediate member is interposed between the first side face of an outer race and the second side face of an inner race opposing to the first side face so as to be rotatable relative to both the side faces. Herein, in the rotation of the outer race in one direction (first direction), the intermediate member slides in the other direction (second direction) reverse to one direction (first direction) mentioned above, along inclined planes which are formed in either of the outer race or the inner race. As a result, first teeth and second teeth respectively formed in the first side face and the second side face are brought near and engaged by an urging force bestowed on at least one of (e.g., from a fluid pressure) the outer race and the inner race, so that the rotation of the outer race in one direction (first direction) mentioned above is prohibited.

On the other hand, in the rotation of the outer race in the other direction (second direction), the intermediate member slides in one direction (first direction) mentioned above, along the inclined planes. As a result, the first teeth and the second teeth are completely kept away and disengaged owing to the existence of the intermediate member itself, so that the rotation of the outer race in the other direction (second direction) is allowed without the touch between the first teeth and the second teeth. The production of shock noise is also prevented from occurring.

According to another feature of the present invention, an intermediate member is interposed between the first side face of an outer race and the second side face of an inner race which is located in opposition to the first side face with a predetermined distance held therebetween, so as to be rotatable relative to both the side faces. Herein, in the rotation of the outer race in one direction (first direction), the intermediate member is slidden in the other direction (second direction) along inclined planes which are formed in either of the outer race or the inner race, until it comes into contact with both of the first teeth and the second teeth, the other direction (second direction) being reverse to one direction (first direction) mentioned above. As a result, the rotation of the outer race in one direction (first direction) mentioned above is prohibited.

On the other hand, in the rotation of the outer race in the other direction (second direction), the intermediate member slides in one direction (first direction) mentioned above along the inclined planes until it comes away from, at least, one of the first teeth and the second teeth. As a result, the rotation of the outer race in the other direction (second direction) is allowed. Simultaneously, since the predetermined distance is held between the first side face and the second side face, the first teeth and the second teeth do not interfere with each other, and the production of shock noise is prevented from occurring.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Now, examples of the more practicable aspects of performance of the present invention will be described in detail with reference to the drawings.

Figure 1:
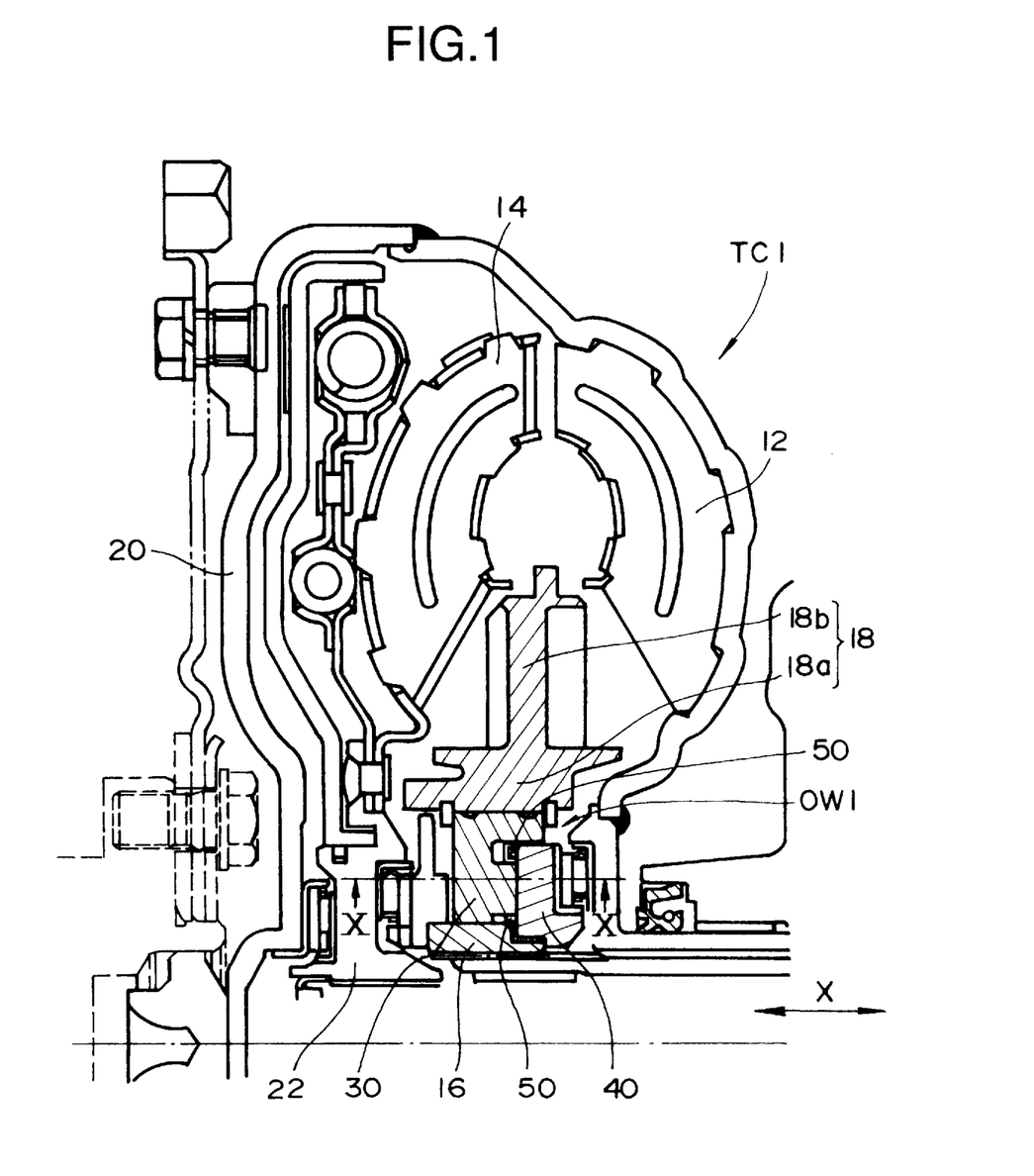
FIG. 1 is a vertical sectional view showing the outline of a torque converter which is furnished with a one-way clutch mechanism according to the first aspect of performance of the present invention.

FIG. 1 is a vertical sectional view showing the outline of a torque converter TC1 which is equipped with a one-way clutch mechanism according to the first aspect of performance of the present invention.

The torque converter TC1 has a pump impeller 12 which generates a fluid stream, a turbine runner 14 which is rotated by the fluid stream, a stationary shaft (concretely, a hub member) 16, and a stator 18 which is arranged between the pump impeller 12 and the turbine runner 14 so as to receive a turning force from the fluid stream.

The pump impeller 12 is united with a front cover 20 which is connected with an unshown engine, and it is rotated by the engine.

The turbine runner 14 is mounted on the output shaft (not shown) of the torque converter TC1 through a turbine hub 22.

The stationary shaft 16 is united with a fixing member (a transmission housing) which is not shown.

The stator 18 has a stator hub 18a on its inner circumferential side, and has blades 18b on the outer circumference of the stator hub 18a.

The stator 18 is furnished with a one-way clutch OW1. The one-way clutch OW1 connects and fixes the stator 18 to the stationary shaft 16 when the blades 18b of the stator 18 have received the turning force of one specified direction from the fluid stream. In contrast, the one-way clutch OW1 allows the stator 18 to rotate when the stator blades 18b have received the turning force of the other direction (in the idle mode of this clutch, that is, during the release thereof).

The one-way clutch OW1 includes an outer race (or outer plate) 30, an inner race (or inner plate) 40 and an intermediate member 50.

The outer race 30 is united with the stator hub 18a forming the inner circumferential side of the stator 18 (that is, it is assembled so as to be unrotatable relative to the stator 18), and supports the stator 18 so as to be movable in the axial direction X of the torque converter TC1 and rotatable with respect to the stationary shaft 16. Further, the inner race 40 is united with the stationary shaft 16 on the outer circumferential side thereof (that is, it is assembled so as to be unrotatable relative to the stationary shaft 16). Besides, the intermediate member 50 is arranged between the outer race 30 and the inner race 40 so as to be movable in the axial direction X and rotatable.

Figure 2:
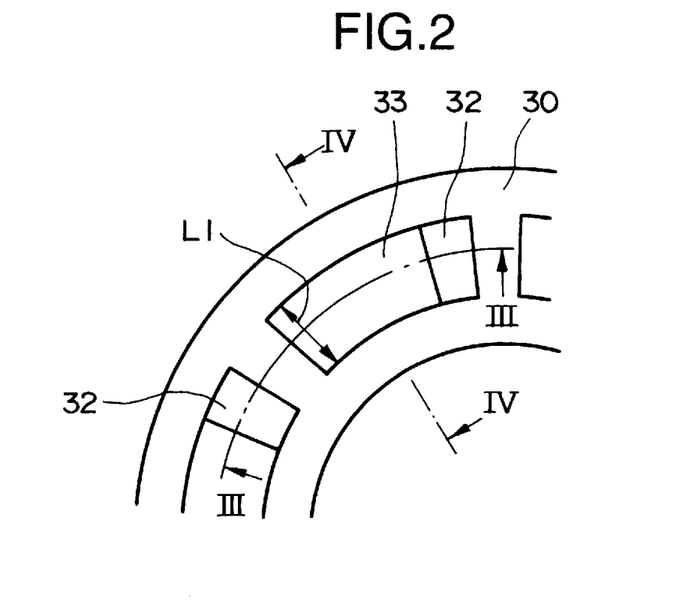
FIG. 2 is a plan view showing the quarter part of an outer race in the first aspect of performance.
Figure 3:
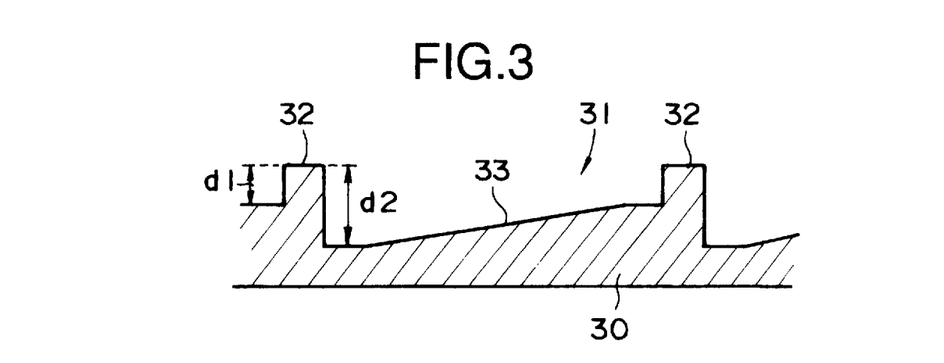
FIG. 3 is a developed sectional view taken along line III—III in FIG. 2.
Figure 4:
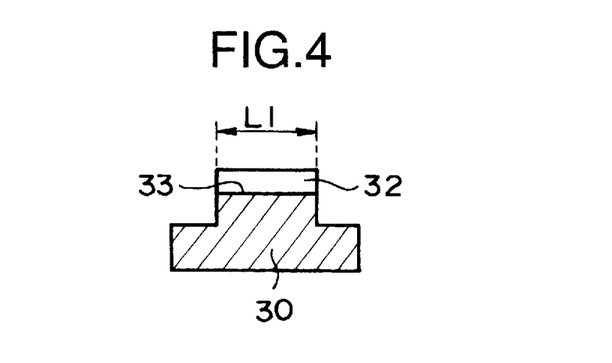
FIG. 4 is a sectional view taken along line IV—IV in FIG. 2.

FIG. 2 is a plan view of the outer race 30, which particularly illustrates only the quarter part of this outer race 30. FIG. 3 is a developed sectional view taken along line III—III in FIG. 2, while FIG. 4 is a similar sectional view taken along line IV—IV in FIG. 2.

As illustrated in FIG. 3, the outer race 30 has a first side face 31 which is provided with first teeth 32 and inclined planes 33. In addition, the length of each of the first teeth 32 in the radial direction of the outer race 30 is L1 as indicated in FIGS. 2 and 4.

Figure 5:
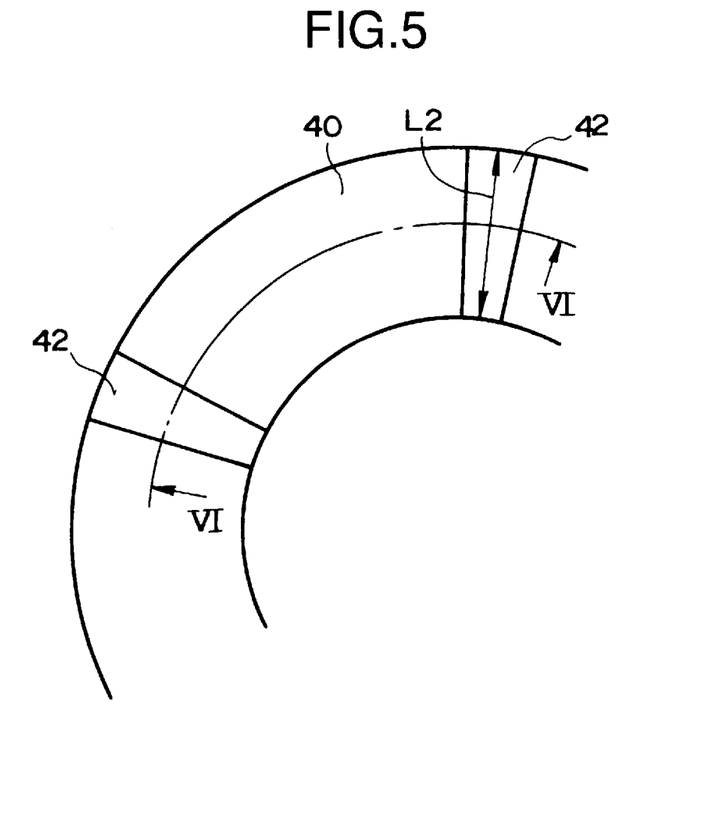
FIG. 5 is a plan view showing the quarter part of an inner race in the first aspect of performance.
Figure 6:
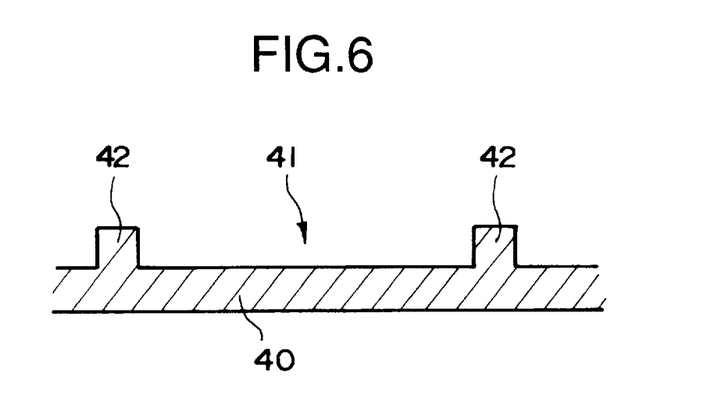
FIG. 6 is a developed sectional view taken along line VI—VI in FIG. 5.

FIG. 5 is a plan view of the inner race 40, which particularly illustrates only the quarter part of this inner race 40. FIG. 6 is a developed sectional view taken along line VI—VI in FIG. 5. As illustrated in FIG. 6, the inner race 40 has a second side face 41 which is provided with second teeth 42. In addition, the length of each of the second teeth 42 in the radial direction of the inner race 40 is L2 as indicated in FIG. 5.

Figure 7:
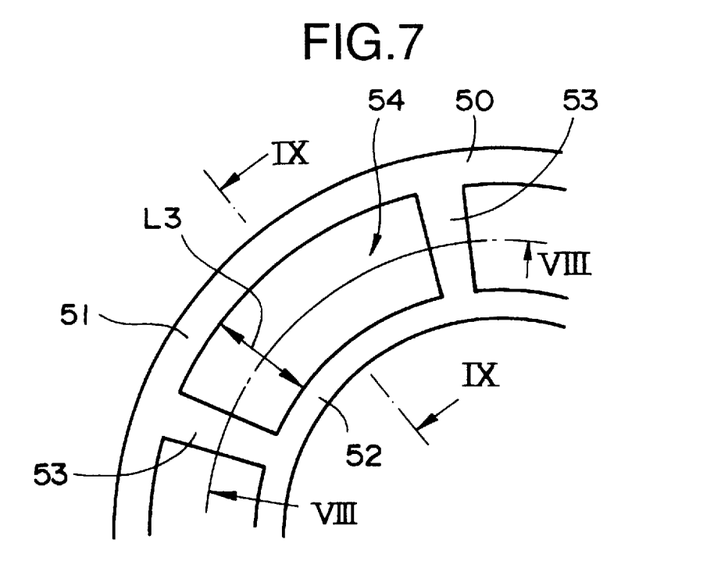
FIG. 7 is a plan view showing the quarter part of an intermediate member in the first aspect of performance.
Figure 8:
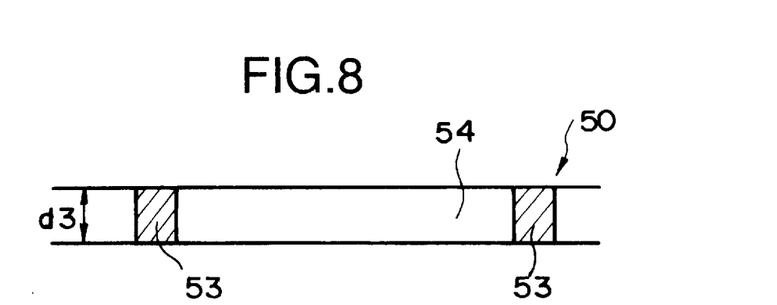
FIG. 8 is a developed sectional view taken along line VIII—VIII in FIG. 7.
Figure 9:
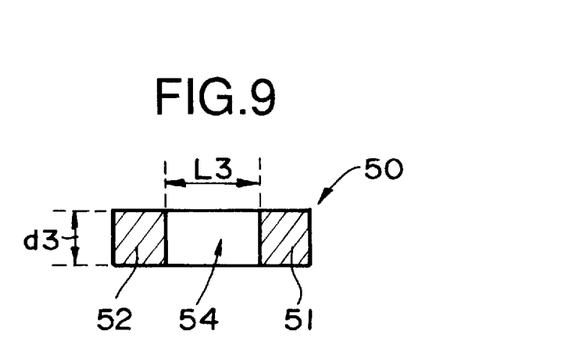
FIG. 9 is a sectional view taken along line IX—IX in FIG. 7.

FIG. 7 is a plan view of the intermediate member 50, which particularly illustrates only the quarter part of this intermediate member 50. FIG. 8 is a developed sectional view taken along line VIII—VIII in FIG. 7, while FIG. 9 is a similar sectional view taken along line IX—IX in FIG. 7. As illustrated in FIG. 7, the intermediate member 50 is constituted by two annular submembers 51 and 52 joined by spoke-like submembers 53, and is formed with holes 54 each of which is in an oblong shape curved in the circumferential direction of this intermediate member 50. The length of each spoke-like submember 53, in other words, the width of each hole 54 in the radial direction of the intermediate member 50 is L3 as indicated in FIG. 7 or 9. The relationship among the width L1 of the first tooth 32, the width L2 of the second tooth 42 and the width L3 of the hole 54 is set as L1<L3<L2.

The thickness of the intermediate member 50 (the length thereof in the axial direction X of the torque converter TC1) is d3 as indicated in FIG. 8 or 9. The relationship of the thickness d3 of the intermediate member 50 with the heights (axial lengths) d1 and d2 of the first tooth 32 as indicated in FIG. 3 is set as d1<d3<d2.

Figure 10A:
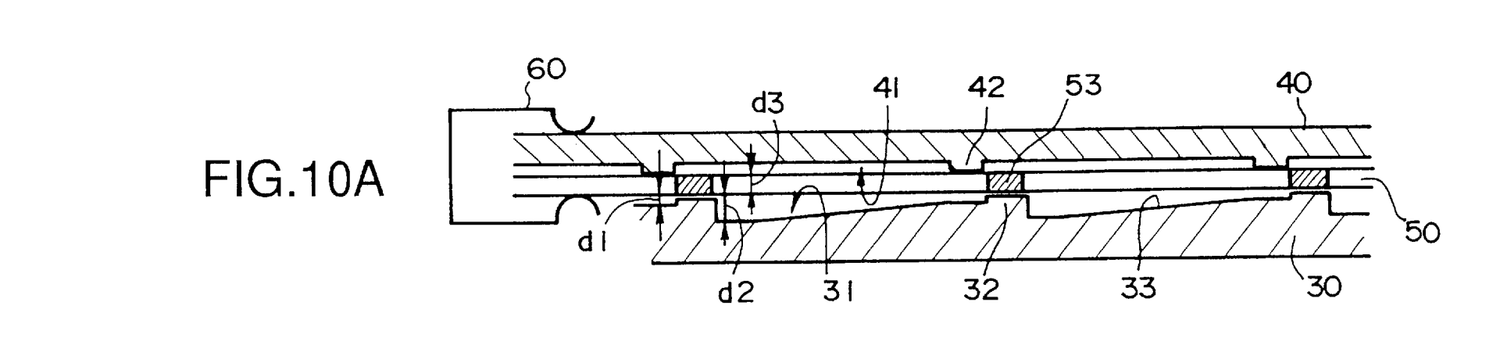
FIGS. 10A thru 10C are sectional views each being taken along line X—X in FIG. 1.
Figure 10B:
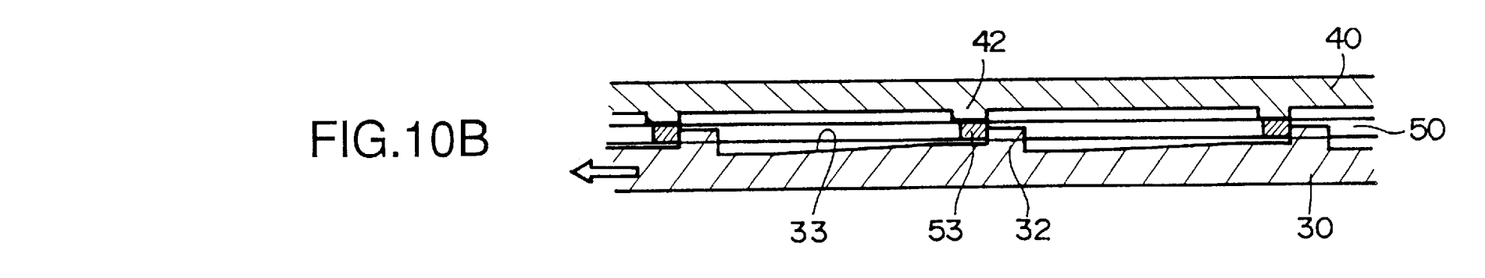
Figure 10C:
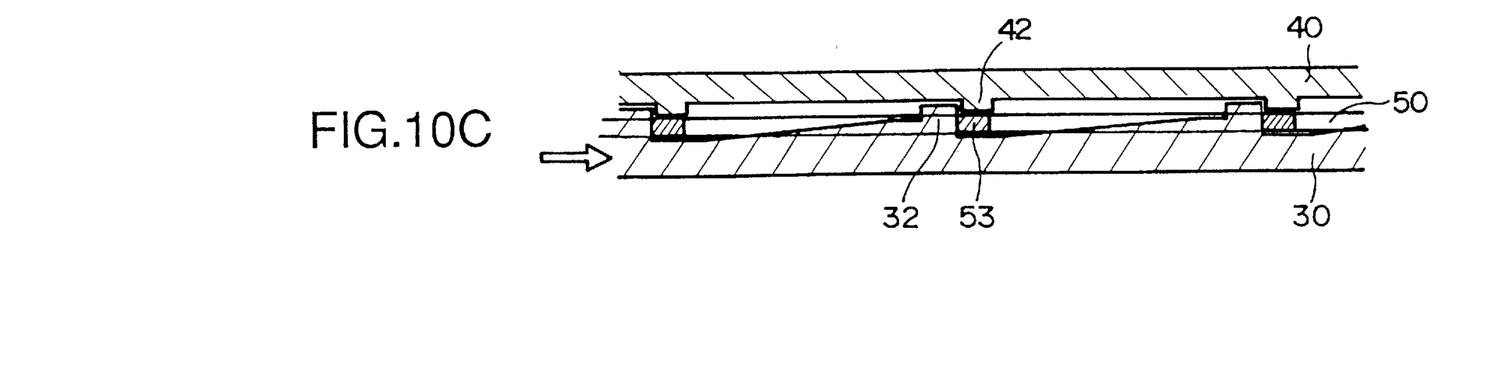

FIGS. 10A thru 10C are developed sectional views each being taken along line X—X in FIG. 1. The outer race 30, inner race 40 and intermediate member 50 are combined as illustrated in FIG. 10A.

Referring to FIG. 10A, the inner plate 40 and the intermediate member 50 are pressed against each other by a leaf spring 60 so as to be rotatable in the circumferential direction of the torque converter TC1. However, since the radial length L2 of each second tooth 42 of the inner plate 40 is greater than the radial width L3 of each hole 54 of the intermediate member 50, each second tooth 42 cannot protrude onto the side of the outer plate 30 beyond the intermediate member 50. In contrast, since the radial length L1 of each first tooth 32 of the outer plate 30 is smaller than the radial width L3 of each hole 54 of the intermediate member 50, each first tooth 32 can move within the hole 54 of the intermediate member 50.

In a case where, as shown in FIG. 10B, the spoke-like submembers 53 of the intermediate member 50 abut against the first teeth 32 of the outer plate 30 on the left side as viewed in the drawing, the first teeth 32 do not protrude onto the side of the inner plate 40 beyond the intermediate member 50 for the reason that the height d3 of the intermediate member 50 is greater than the height d1 of the first tooth 32. On this occasion, accordingly, the first teeth 32 and the second teeth 42 do not come into engagement.

On the other hand, in a case where, as shown in FIG. 10C, the spoke-like submembers 53 of the intermediate member 50 touch the first teeth 32 of the outer race 30 on the right side as viewed in the drawing, the first teeth 32 protrude onto the side of the inner race 40 beyond the intermediate member 50 for the reason that the height d2 of the first tooth 32 is greater than the thickness d3 of the intermediate member 50. On this occasion, accordingly, the first teeth 32 and the second teeth 42 come into engagement.

The operation of this aspect of performance will be explained below.

In a case where, as indicated by an arrow in FIG. 10B, the outer race 30 rotates leftwards as viewed in the drawing, the outer race 30 simultaneously receives an axial force toward the intermediate member 50, and hence, the spoke-like submembers 53 of the intermediate member 50 slide on the inclined planes 33 and rise rightwards as viewed in the drawing. As a result, the spoke-like submembers 53 of the intermediate member 50 abut against the first teeth 32 of the outer race 30 on the left side as viewed in the drawing, and the outer race 30 and the intermediate member 50 integrally rotate leftwards as viewed in the drawing. On this occasion, the first teeth 32 of the outer race 30 cannot protrude onto the side of the inner race 40 beyond the intermediate member 50 as stated before, so that the second teeth 42 slide on the intermediate member 50.

Thus, the outer race 30 rotates without the interference between the first teeth 32 and the second teeth 42. Therefore, no shock noise is produced.

A pressing load in the case of the glide between the intermediate member 50 and the second teeth 42 is determined by the load of the leaf spring 60 and the axial force of the outer race 30 toward the inner race 40. The axial force on this occasion is sufficiently small. Moreover, the one-way clutch OW1 is in the state of bath lubrication, which is the same service environment as that of a conventional thrust metal bearing. Accordingly, problems such as seizure ascribable to friction are not incurred.

In a case where, as indicated by an arrow in FIG. 10C, the outer race 30 rotates rightwards as viewed in the drawing, the spoke-like submembers 53 of the intermediate member 50 glide down leftwards as viewed in the drawing, on the inclined planes 33 of the outer race 30 owing also to the axial force which urges the outer race 30 toward the intermediate member 50. Finally, the spoke-like submembers 53 abut against the first teeth 32 on the right side as viewed in the drawing. As a result, the first teeth 32 protrude onto the side of the inner race 40 beyond the intermediate member 50 for the reason that the height d2 of each first tooth 32 is greater than the thickness d3 of the intermediate member 50. In consequence, the first teeth 32 and the second teeth 42 come into engagement, and the outer race 30 is fixed. Accordingly, the stator 18 is fixed so as to be unrotatable.

Phases of the second teeth 42 of the inner race 40 and the spoke-like submembers 53 of the intermediate member 50 are adjusted so that the first teeth 32 and the second teeth 42 are not engaged before the spoke-like submembers 53 of the intermediate member 50 abut against the first teeth 32 of the outer race 30.

In this aspect of performance, the rotation (idle rotation) and fixation of the stator 18 are changed-over by the functions of the intermediate member 50 complying with the rotating directions of the outer race 30. During the idle rotation, no parts interfere with each other, and hence, no shock noise is produced.

Now, the second aspect of performance of the present invention will be described.

Figure 11:
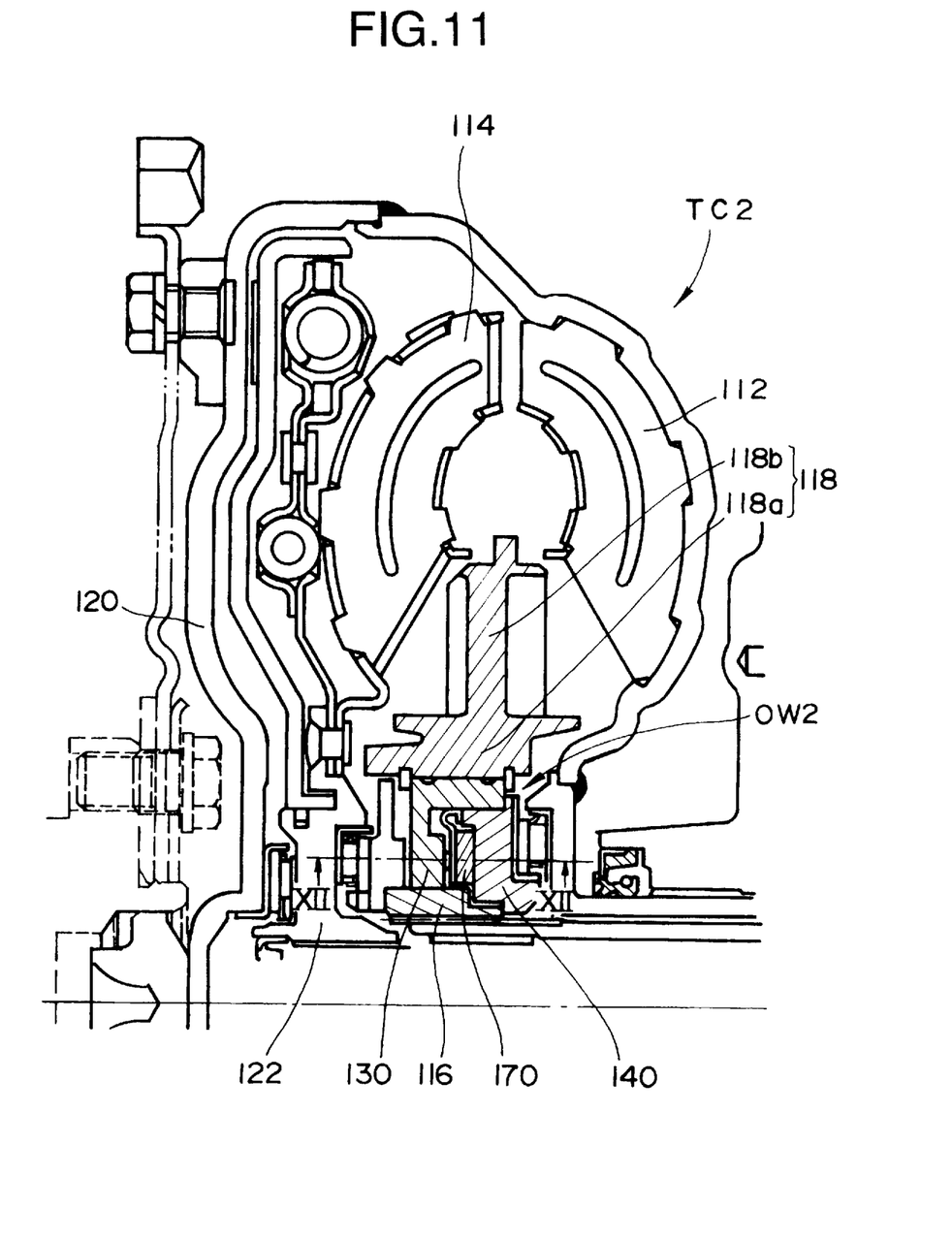
FIG. 11 is a vertical sectional view showing the outline of a torque converter which is furnished with a one-way clutch mechanism according to the second aspect of performance of the present invention.

FIG. 11 is a vertical sectional view showing the outline of a torque converter TC2 which is equipped with a one-way clutch mechanism according to the second aspect of performance of the present invention.

A one-way clutch OW2 in the second aspect of performance includes an outer race 130, an inner race 140 and an intermediate member 170. In the one-way clutch OW1 in the first aspect of performance, the outer race 30 slides in the axial direction X, and the engagement and disengagement between the first teeth 32 of the outer race 30 and the second teeth 42 of the inner race 40 are changed-over by the functions of the intermediate member 50 complying with the rotations of the outer race 30. In contrast, in the one-way clutch OW2 in the second aspect of performance, the axial movements of the outer race 130 and inner race 140 are restrained, and the axial distance between the outer race 130 and inner race 140 is held constant. That is, a stator 118 does not move in the axial direction of the torque converter TC2. Concretely, the first teeth 132 of the outer race 130 and the second teeth 142 of the inner race 140 are engaged through the intermediate member 170 in such a way that the intermediate member 170 comes into contact with both the first teeth 132 and the second teeth 142.

The construction of the torque converter TC2 except the one-way clutch OW2 is the same as in the first aspect of performance, and identical or similar constituents in the second aspect of performance shall be designated by reference numerals or symbols having the same two lower digits.

Figure 12:
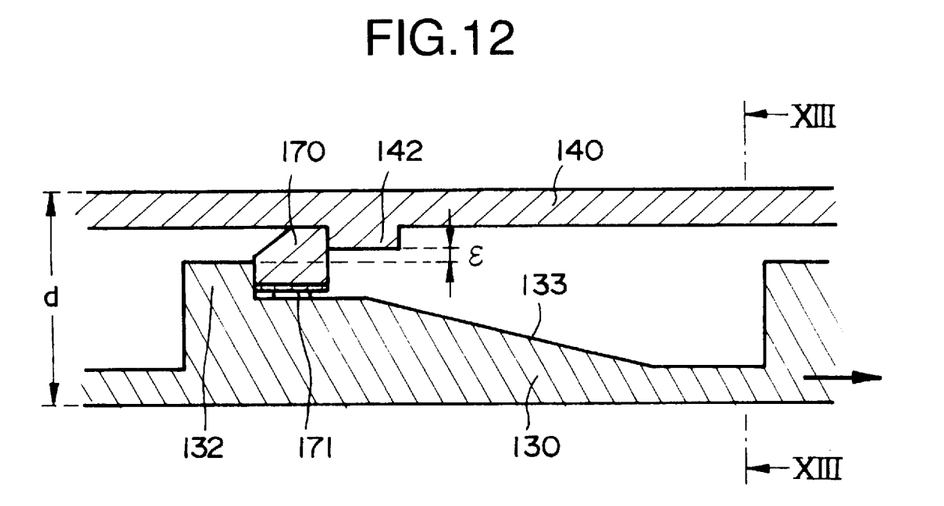
FIG. 12 is a sectional view taken along line XII—XII in FIG. 11.
Figure 13:
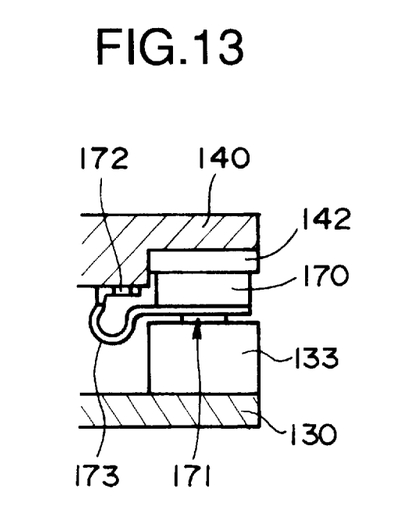
FIG. 13 is a sectional view taken along line XIII—XIII in FIG. 12.

FIG. 12 is a sectional view taken along line XII—XII in FIG. 11, while FIG. 13 is a sectional view taken along line XIII—XIII in FIG. 12.

As illustrated in FIG. 12, the outer race 130 has substantially the same configuration as that of the outer race 30 in the first aspect of performance, and includes the first teeth 132 as well as inclined planes 133. Besides, the inner race 140 includes the second teeth 142.

The outer race 130 is rotatable, but fixed in the axial direction. Besides, the inner race 140 is fixed to a stationary shaft 116. As a result, the axial distance d between the outer race 130 and the inner race 140 is constant. On this occasion, the first teeth 132 and the second teeth 142 have a distance $\epsilon$ in the axial direction, and they do not interfere with each other. As shown in FIG. 12, the first teeth 132 and the second teeth 142 are engaged by bringing the intermediate member 170 into contact with both these teeth 132 and 142.

The intermediate member 170 lies in contact with any of the inclined planes 133 of the outer race 130 through its first contact face 171. Besides, as shown in FIG. 13, the intermediate member 170 includes a second contact face 172 lying in contact with the inner race 140. The first contact face 171 and second contact face 172 of the intermediate member 170 are interconnected by a spring member 173. The first contact face 171 is urged against the inclined plane 133 and the second contact face 172 is urged against the inner race 140 by the spring member 173, accordingly, the intermediate member 170 moves on the inclined plane 133 in compliance with the movement of the outer race 130.

The operation of this aspect of performance will be explained below.

In a case where, as indicated by an arrow in FIG. 12, the outer race 130 rotates rightwards as viewed in the drawing, the intermediate member 170 ascends on the inclined plane 133 of the outer race 130 until it abuts against the first tooth 132 on the right side. On this occasion, the intermediate member 170 abuts also against the second tooth 142 of the inner race 140 on the left side. Thus, the first teeth 132 and the second teeth 142 are engaged through the intermediate member 170, and the outer race 130 is fixed so as to be unrotatable.

Besides, in a case where the outer race 130 rotates in the reverse direction (namely, leftwards), the intermediate member 170 descends on the inclined plane 133.

Figure 14:
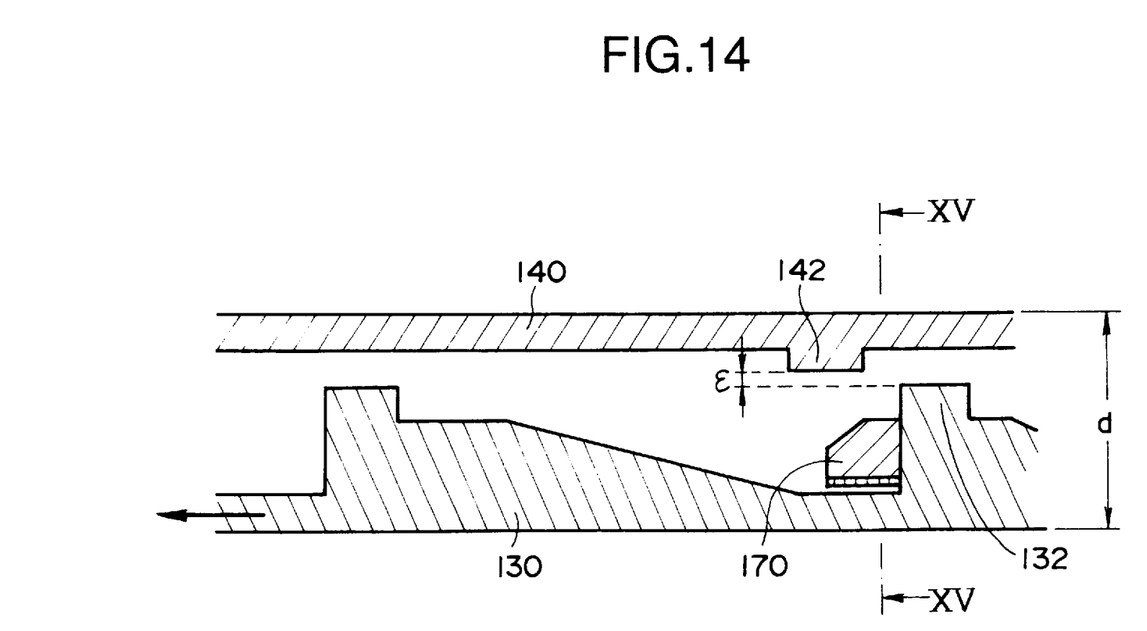
FIG. 14 is a sectional view similar to FIG. 12.
Figure 15:
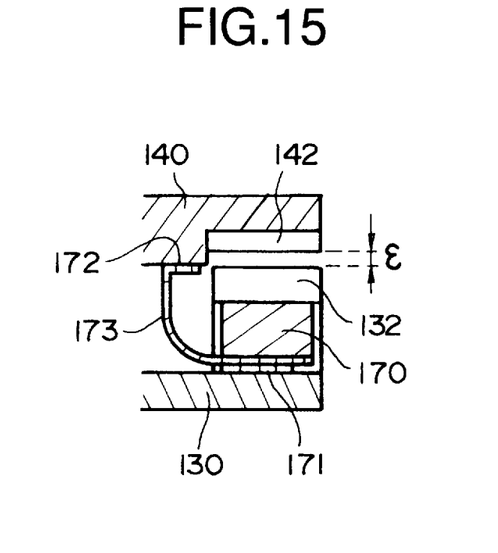
FIG. 15 is a sectional view taken along line XV—XV in FIG. 14.

FIG. 14 is a sectional view similar to FIG. 12, showing this situation. Further, FIG. 15 is a sectional view taken along line XV—XV in FIG. 14.

In the case where, as indicated by an arrow in FIG. 14, the outer race 130 rotates leftwards as viewed in the drawing, the intermediate member 170 descends rightwards on the inclined plane 133 and abuts against the first tooth 132 on the left side on condition that a frictional force on the second contact face 172 is set greater than on the first contact face 171 beforehand. On this occasion, the height of the first tooth 132 is greater than that of the intermediate member 170. Further, the axial distance d between the outer race 130 and the inner race 140 is constant, and the clearance of the distance ε is defined between the first teeth 132 and the second teeth 142. Therefore, the first teeth 132 and the second teeth 142 do not interfere with each other. As a result, the outer race 130 is free to rotate while gliding between the second contact face 172 and the inner plate 140, and no shock noise is produced.

In the first aspect of performance described before, the outer race is formed with the inclined planes and is axially slidden toward the inner race. It is to be understood, however, that the inclined planes may well be formed on the side of the inner race. Alternatively, it is also allowed to axially slide the inner race toward the outer race. The urging force for the outer race or the inner race may well be afforded by utilizing a fluid pressure or by means of a wave spring.

Also in the second aspect of performance, the outer race and the inner race may well be interchanged in such a manner that the inclined planes are formed on the side of the inner race, whereupon the second contact face (on a side having no inclination) is held in contact with the outer race. Herein, on condition that the frictional force between the second contact face and the outer race is set greater than the frictional force between the first contact face and the inclined plane beforehand, the intermediate member is dragged and moved on the inclined planes with the rotation of the outer race. Thus, a similar effect can be attained.

As described above, according to the present invention, no parts collide in the idle mode of a clutch, so that the production of shock noise as in the prior art can be prevented from occurring. Especially, a stator is not shifted in the axial direction of a torque converter, so that any interference around the stator is not caused.

What is claimed is:

1. A one-way clutch mechanism in a torque converter having a pump impeller which generates a fluid stream, a turbine runner which is rotated by the fluid stream, a stationary shaft, a stator which is arranged between the pump impeller and the turbine runner so as to receive a turning force from the fluid stream, and one-way clutch device for connecting the stator to the stationary shaft when the stator has received the turning force of specified direction from the fluid stream, said one way clutch device comprising:

an outer race which is assembled on an inner circumferential side of said stator so as-to be unrotatable relative to said stator, and which includes a first side face perpendicular to an axis of said torque converter, said first side face being formed with first teeth;

an inner race which is assembled on an outer circumferential side of said stationary shaft so as to be unrotatable relative to said stationary shaft, and which includes a second side face opposite to said first side face of said outer race, said second side face being formed with second teeth that can prohibit said outer race from rotating in one direction, by meshing with said first teeth;

an intermediate member which is interposed between said first and second side faces so as to be rotatable relative to both of said side faces;

an urging means which gives at least one of said outer race and said inner race an urging axial force toward the other; and inclined planes which are formed on either of said first side face of said outer race or said second side face of said inner race; wherein,
the rotation of said outer race in said one direction is prohibited in such a way that said first teeth and said second teeth are brought near and engaged through a slide of said intermediate member with said urging axial force in the other direction along said inclined planes, said other direction being reverse to said one direction; and
a rotation of said outer race in said other direction is allowed in such a way that said first teeth and said second teeth are kept away and disengaged through a slide of said intermediate member itself in said one direction along said inclined planes.

2. A one-way clutch mechanism of a torque converter as defined in claim 1, wherein said intermediate member includes two annular submembers, and spoke-like submembers which join said annular submembers with oblong holes defined thereamong; and said second teeth of said inner race and said spoke-like submembers of said intermediate member are adjusted so as to prevent said first teeth and said second teeth from being engaged before said spoke-like submembers abut against said first teeth.

3. A one-way clutch mechanism of a torque converter as defined in claim 1, wherein said urging axial force of the urging means is afforded by a leaf spring.

4. A one-way clutch mechanism of a torque converter as defined in claim 1, wherein said urging axial force of the urging means is afforded by a fluid pressure.

5. A one-way clutch mechanism in a torque converter having a pump impeller which generates a fluid stream, a turbine runner which is rotated by the fluid stream, a stationary shaft, a stator which is arranged between the pump impeller and the turbine runner so as to receive a turning force from the fluid stream, and one-way clutch device for connecting the stator to the stationary shaft when the stator has received the turning force of specified direction from the fluid stream, said one way clutch device comprising:

an outer race which is assembled on an inner circumferential side of said stator so as to be unrotatable relative to said stator, and which includes a first side face perpendicular to an axis of said torque converter, said first side face being formed with first teeth;

an inner race which is assembled on an outer circumferential side of said stationary shaft so as to be unrotatable relative to said stationary shaft, and which includes a second side face that is located in opposition to said first side face of said outer race with a predetermined distance held therebetween, said second side face being formed with second teeth;

an intermediate member which is interposed between said first and second side faces so as to be rotatable relative to both of said side faces; and inclined planes which are formed on one of said first side face of said outer race and said second side face of said inner race, a height of said intermediate member being less than a height of the one of said first side face and said second side face; wherein, a rotation of said outer race in one direction is prohibited in such a way that said intermediate member is slid in the other direction along said inclined planes until it comes into contact with both of said first teeth and said second teeth, said other direction being reverse to said one direction; and a rotation of said outer race in said other direction is allowed in such a way that said intermediate member is slidden in said one direction along said inclined planes until it comes away from the teeth of the other of said first side face and said second side face.

6. A one-way clutch mechanism of a torque converter as defined in claim 5, wherein said first side face of said outer race is formed with said inclined planes; said intermediate member includes a first contact face lying in contact with any of said inclined planes, and a second contact face lying in contact with said inner race; and a frictional force between said first contact face and said outer race is set less than a frictional force between said second contact face and said inner race.

7. A one-way clutch mechanism of a torque converter as defined in claim 5, wherein said second side face of said inner race is formed with said inclined planes; said intermediate member includes a first contact face lying in contact with any of said inclined planes, and a second contact face lying in contact with said outer race; and a frictional force between said second contact face and said outer race is set greater than a frictional force between said first contact face and said inner race.

* * * * *